April 30, 1968
G. W. LUGER
3,380,572
VIBRATORY CONVEYOR
Filed Sept. 29, 1965
3 Sheets-Sheet 1
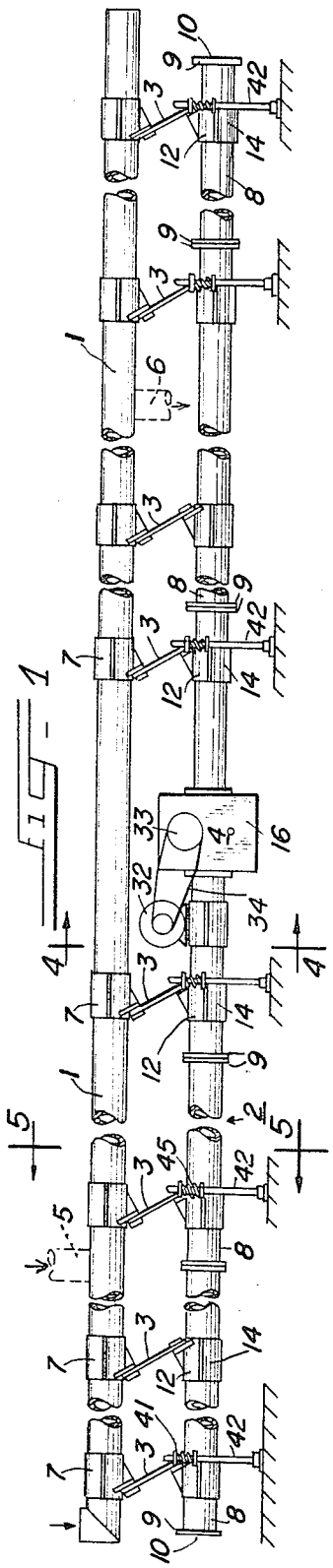
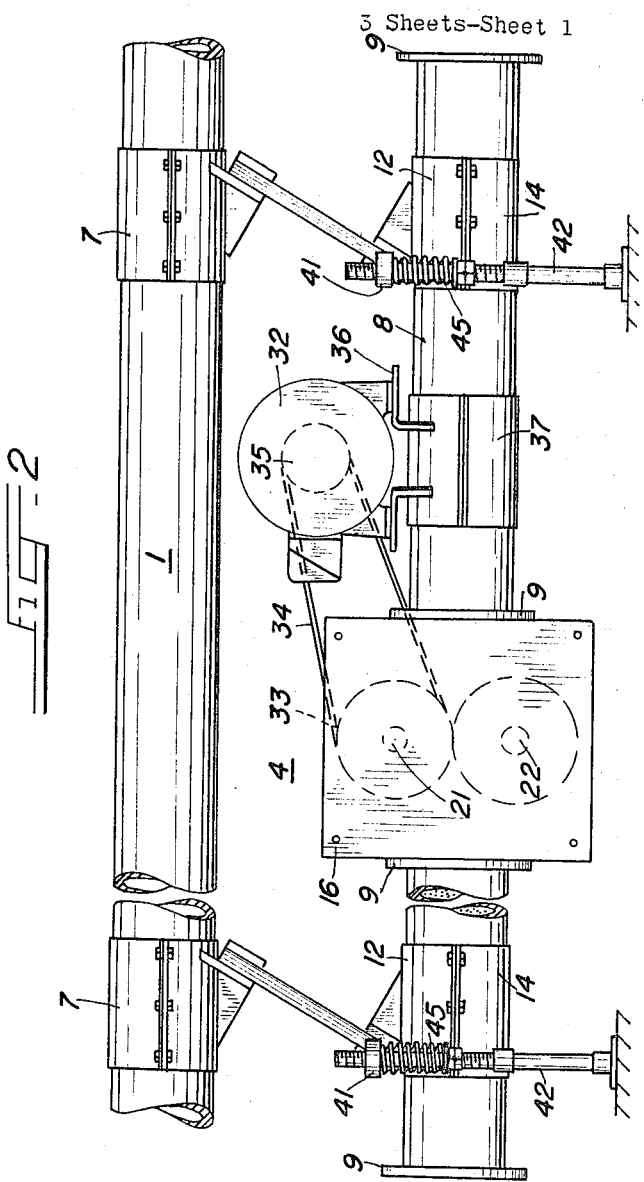
INVENTOR
GEORGE W. LUGER
BY
Rummler & Snow
ATTYS.

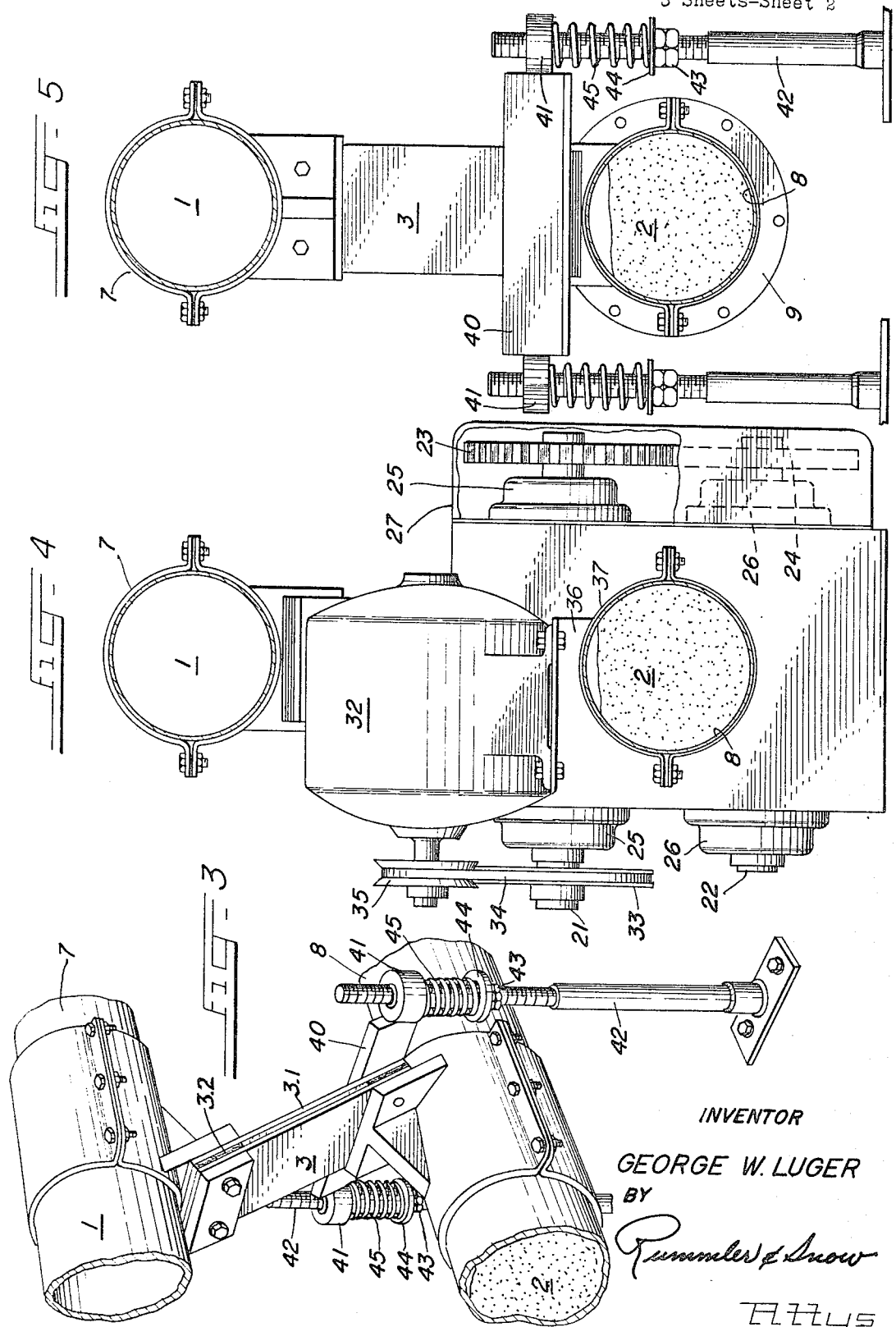

April 30, 1968
G. W. LUGER
3,380,572
VIBRATORY CONVEYOR
Filed Sept. 29, 1965
3 Sheets-Sheet 3
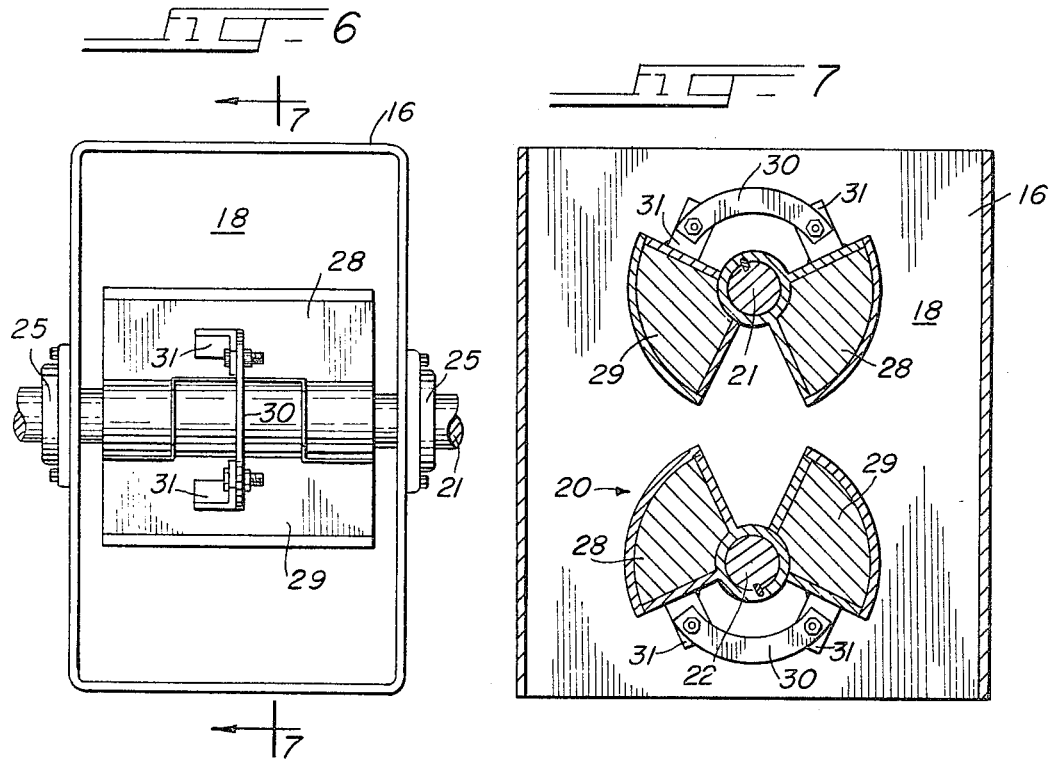
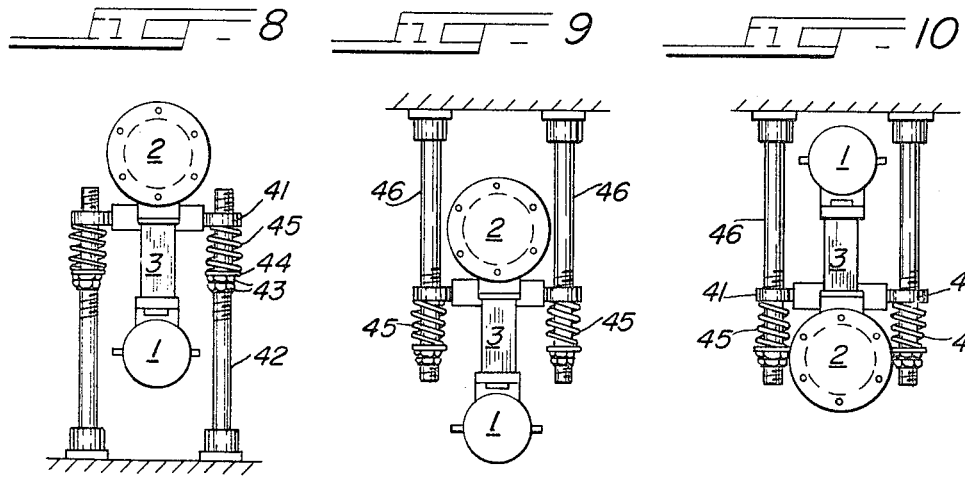
INVENTOR.
GEORGE W. LUGER
BY Rummler & Snow
ATTYS.

United States Patent Office 3,380,572
Patented Apr. 30, 1968

3,380,572
VIBRATORY CONVEYOR
George W. Luger, Minneapolis, Minn., assignor to Hart-Carter Company, Chicago, Ill., a corporation of Delaware
Filed Sept. 29, 1965, Ser. No. 491,122
6 Claims. (Cl. 198—220)

The invention pertains to improvements in vibratory conveyors, and particularly such devices of the two-mass two-spring type wherein the conveying member is supported by inclined springs from an intermediate base member, which, in turn, is resiliently supported from a substantially stable or fixed foundation, such as a floor or ceiling of an industrial building.

Operative conveyor devices of this kind have been known, and in the process of development, for many years because they have the advantage of low cost for a given capacity compared with other kinds of conveying systems. A particular handicap, however, has been the need for massive, fixed support or foundation to absorb the reactive forces resulting from the vibratory actuation of the conveying member. Thus, the development problem has been to design a vibratory conveyor system wherein the reactive forces are absorbed within the system itself so that the system can be utilized in ordinary building structures where the vibratory forces created within the system, if imparted to the building structure, would result in damage of the structure. Vibratory conveyors heretofore proposed have not fully solved this problem.

The main object of this invention, therefore, is to provide an improved vibratory conveyor system wherein substantially all of the vibratory forces involved are absorbed within the system and its resilient mounting means. Other objects are to provide an improved vibratory conveyor that can be installed at substantially any location in a conventional industrial building structure; to provide such a device having standardized sectional components which can be variously assembled in the field to provide a conveyor that will accommodate many different installation conditions; to provide such a vibratory conveyor that can be mounted on substantially any industrial building floor or ceiling capable of supporting the weight of the normal work load to which the building structure may be subjected; to provide an improved vibratory conveyor made of relatively lightweight materials which will absorb within itself the forces by which it is operated; to provide such a device that will handle a large variety of comminuted or granular materials at substantial flow rates; to provide such a device wherein the self absorption of the reactive vibratory forces is done without materially reducing the flow rate of material being conveyed; and to provide an improved vibratory conveyor of a simplified construction and which can be manufactured and installed at a lesser cost than those heretofore known.

A specific embodiment of this invention is shown in the accompanying drawings in which:

FIGURE 1 is an elevational view of a vibratory conveyor embodying my invention, parts being broken away because of conveyor length.

FIG. 2 is an enlarged, elevational view, showing the cyclic vibrator drive section of the conveyor shown in FIG. 1.

FIG. 3 is a fragmentary perspective view showing a spring plate connection between the conveying member (upper) and the frame member, and a resilient means for supporting the conveyor assembly from a stationary base.

FIG. 4 is a view, partly in section, as taken on line 4—4 of FIG. 1 to show the arrangement of the cyclic drive means for the conveyor.

FIG. 5 is a sectional view, as taken on line 5—5 of FIG. 1, showing further details of the construction of the improved conveyor.

FIG. 6 is a plan view of the cyclic drive means with the cover plate removed to show one of the adjustable eccentric weights therein.

FIG. 7 is a sectional elevation as taken on line 7—7 of FIG. 6 to show the opposed relation of the two eccentric weights in the conveyor drive means.

FIG. 8 is an end view of a floor mount arrangement of the improved conveyor with the frame member disposed above the conveying member.

FIG. 9 is a similar view showing a ceiling mounted arrangement of the improved conveyor with the frame member disposed above the conveying member, and FIG. 10 is a view like FIG. 9, but with the frame member disposed below the conveying member.

As shown in the drawings, my improved vibratory conveyor comprises a conveying member 1, in the form of a hollow tube extending from end to end of the conveyor, a base or frame member 2 extending parallel with the conveying member in spaced relation therewith, a plurality of inclined spring members or beams 3 which support the conveying member resiliently from the frame member 2, and a drive means 4 rigidly connected with the frame member and adapted to impart cyclic vibrations thereto at a predetermined frequency.

Generally considered, these elements are the conventional elements of a vibratory conveyor of the kind to which the present invention relates, and it will be understood that the conveying member may be of any desired length along a generally straight line, having any number of inlets and outlets, as indicated at 5 and 6 respectively in FIG. 1, and be provided with sections for screening, heating, cooling or any other treatment that can be applied to the flowing material.

The conveying member 1 may be formed of lengthwise sections connected in end-to-end abutments by suitable clamp means 7, as will be hereinafter described, to provide a smooth surfaced conduit along which the conveyed material can flow when propelled in the usual manner by the upward and forward vibratory movement of the conveying member. The conveying member sections may be of any convenient length, preferably in multiples of some basic measurement of such as 5 feet, except for the end sections which will be made of a length to suit the particular installation requirements.

A particular distinction of my present invention resides in the form, construction and arrangement of the base or frame member 2, and the form and arrangement of its support from the building structure on which the conveyor is mounted.

As shown, the frame member 2 is formed of tubular sections 8, of a uniform, convenient length, connected end-to-end to provide an elongate hollow body, having about the same length as the conveying member 1. Each section 8 is provided with end closure members 9, each in the form of a solid plate, dimensioned so as to be of greater area than the cross-sectional area of the respective frame member sections, and thereby provide peripheral flanges projecting radially outward from the body of the section. These closure members, or plates 9, are welded onto the ends of the respective frame members 8 and the flange portions at each joint, for connection of the abutting sections comprising the frame body, are firmly bolted or otherwise bonded together to provide a coupling of the sections to each other that will be as rigid as possible.

In the form shown, each hollow section of the frame body is weighted by being filled with a quantity of particulate material, such as dry sand, so that the added weight is distributed substantially uniformly over the length of the hollow section. Also, as shown, each end of the frame body is terminated by a solid plate 10, which, like the plate 9, is of a size to provide a peripheral radially projecting flange.

The conveying member 1 is supported from the frame member 2 by means of the spring beams 3 which have their ends rigidly clamped to the respective members and which extend from the frame member to the conveying member at an angle of about 60° from the axis of the frame member, and in the direction such that the upward movement of the conveying member, against the force of gravity, as the spring beams react to the vibrations of the frame member, will be in the desired direction of material flow in the conveying member.

As shown, the spring beams 3 are each constructed of a plurality of flat, rectangular plates 3.1 assembled in spaced face to face relation with the intervening spacers 3.2 disposed at the ends of the beam within the mounting or clamping area. These plates are made of layers of epoxy impregnated fiberglass, laminated to a substantially uniform thickness, and are dimensioned so that the stack or assembly, comprising a spring beam 3, will have a spring constant value appropriate for the mass of the conveying member 1. One end of each spring beam is rigidly attached to the outer side of a semi-cylindrical clamp part 12, formed to mate with a companion clamp part 14 for solidly embracing the frame member 2, and the opposite end of each spring beam is solidly secured to the adjacent half of a clamp means 7, which, like the clamp parts 12 and 14, is made in two half-sections adapted to be rigidly connected with the conveying member 1. Preferably the spring beams 3 are uniformly spaced along the length of the conveying member 1, on centers spaced apart substantially the equivalent of the basic measurement of the conveying tube sections, so that the joint between any pair of the said sections will be encompassed by one of the clamp means 7 and rigidly secured thereby.

In any case, the clamp means comprising the parts 12 and 14, which rigidly connect the spring beams to the frame member 2, will be located adjacent but not at the ends of the respective frame member sections, the end to end connection of the said sections to each other being by means of the flanges provided by the closure plates 9 rigidly welded to the ends of the frame member sections. The reason for this is that I have discovered that much more satisfactory operation of the vibratory conveyor system is had when the rigid flange joint between frame sections is used, rather than the readily available clamp type of connecting means, comprising the clamp parts 12 and 14.

The drive means 4 for actuating the improved vibratory conveyor system comprises a hollow, rigid walled, eccentric weight box 16 rigidly attached to and comprising a part of the frame member 2. Within this weight box 16 are two equal eccentric weights 18 and 20 disposed one above the other, to rotate on individual horizontal shafts 21 and 22, respectively, which extend transversely of the frame axis. The shafts for these weights are directly geared together, so as to rotate in opposite directions, by gears 23 and 24 (see FIG. 4), and the weights are angularly displaced relative to each other so as to be in opposed relation at the two vertical positions. In this way, the vertical components of the forces generated by the rotating weights substantially cancel each other, thereby eliminating vertical forces in the frame caused by the drive mechanism.

As shown in FIGS. 4, 6 and 7, the weight shafts 21 and 22 are journalled in bearing bosses 25 and 26, respectively, mounted on the outside of opposite walls of the weight box 16, and the gears 23 and 24, which are disposed outside of the weight box 16, are enclosed by a cover 27 suitably mounted on the adjacent side of the weight box. Also, as shown in FIGS. 6 and 7, each of the eccentric weights 18 and 20, comprises a pair of parts 28–29 of equal length and of quadrant shape in section mounted on a common shaft. One part 28 has a hub adjacent each end which is keyed to the shaft, the two hubs being spaced apart about one-half the length of the weight; and the other part 29 has a centrally disposed hub proportioned to fit between the hubs of the part 28. The hub of part 29 is freely rotatable on the shaft and the two parts are connected by a strap 30 which is bolted at each end to an angle bracket 31 welded on to the respective weight part. Thus, by varying the length of the strap 30, the angular spacing of the two weight parts 28 and 29 can be changed to increase or decrease the extent of eccentricity of the weight on each shaft according to the force needed from the drive means or unit 4. It will be understood that such adjustment of the weight parts 28 and 29 will be the same for each eccentric 18 and 20.

As shown in FIGS. 1, 2 and 4, the drive means is powered by an electric motor 32, connected to a pulley 33 on the upper eccentric weight shaft 21, at the side of the weight box 16 opposite the gears 23–24, by means of a belt 34 running from a motor pulley 35. The motor 32 is shown mounted directly on frame 2 adjacent the weight box 16, by means of a platform 36 rigidly secured in place by a clamp means 37 similar to the clamp means 7. It will be understood, however, that the motor 32 may be mounted in any convenient manner, on the frame, or separately therefrom on some convenient part of the building structure.

As will be understood by those skilled in this art, the operation of the drive means will produce a standing wave in the elongate frame member 2. It is by controlling the amplitude and location of this standing wave in the frame member that I obtained the improved conveyor operation resulting from my invention, and I have found that, to produce optimum results, the location of the drive means 4 on the frame 2 appears to be critical. Thus, I have found that the drive means should be so located, relative to the ends of the conveyor system, that the standing wave in the frame member will be of minimum amplitude and located so that the discharge end of the conveying member will be at or adjacent a node. Also, for optimum operating conditions of the conveyor system, the drive means is preferably located at a node in the standing wave of the frame member.

These conditions can readily be determined for conveyors of various lengths and a more or less standard drive means section can be provided for assembly with other standardized components to form a frame member of the desired length. For example, the drive means 4 may be connected between two short frame member sections, with the adjacent end flanges 9 thereof bonded directly to the opposite end walls of the weight box 16 as shown in FIGS. 1 and 2. This assembly is then preferably located in the frame member structure so as to be about midway between a pair of the spring beams 3 which support the conveying member 1 from the frame 2.

The conveying member-frame-drive means assembly of my invention is mounted to the primary supporting structure, that is, the floor or ceiling of an industrial building by means of a so-called soft or cushioned suspension on vertically disposed coiled springs, which comprise the secondary springs of the two-mass two-spring vibratory conveyor system to which my invention is directed. FIGS. 1 to 15 inclusive illustrate the improved conveyor system in a floor mounted arrangement, and as shown certain of the spring clamps 12–14 on the frame member 2 are provided with a cross-arm 40 (see FIGS. 3 and 5) which overhangs each side of the frame 2 and terminates at each end in a vertically opening eye 41. Each eye 41 is loosely fitted over the upper end of a threaded vertical post or rod 42 fixed to the floor and having mounted thereon a pair of level-adjusting nuts 43, a washer 44, and a helically coiled compression spring 45, in the order named. The eyes 41 rest directly on the coiled springs 45 and the entire weight of the conveyor assembly is directly supported thereby.

As shown, the spring beams 3 at each end of the frame 2, and those at each end of the drive unit 4, are provided with the cross arms 40 and mounted on the secondary springs 45. Also, substantially each alternate spring between the ends of the conveyor is likewise supported on secondary springs 45.

FIGS. 8, 9, and 10 show alternate arrangements for suspension of the conveyor assembly from the floor or ceiling of a building structure. FIG. 8 shows a floor mounted arrangement similar to that of FIG. 1, but with the conveyor member 1 disposed below the frame member 2. In this case the spring beams 3 would slant downwardly from the frame in the direction of material flow in the conveyor member 1. FIG. 9 shows a ceiling suspension arrangement that is similar to FIG. 8 in that the conveying member is below the frame. In FIG. 9, however, the posts 48 hang downwardly from the ceiling and the springs are disposed to bear the weight of the conveyor assembly. FIG. 10 shows a ceiling suspension arrangement wherein the conveying member 1 is above the frame 2, the load being supported by springs 45.

In operation of the improved conveyor system, the drive means 4 is run at a frequency (r.p.m.) approximately the same as the natural or critical frequency of the conveying member and its mounting springs. This causes the conveying member to move a sufficient distance or stroke in the upward direction relative to the frame member and substantially normal to the plane of the spring beam 3 so as to result in a conveying action on dry flowable material fed into the inlet end of the conveying member. In this action the frequency or speed of the drive means is so far removed from the natural frequency of the frame member and its secondary spring system, that the frame member remains relatively stationary insofar as the force producing mechanism is concerned.

The vertical component of the reaction of the conveying member during operation, which varies with the work or load of material being conveyed, causes the frame member to deflect in a vertical plane so as to produce the before-mentioned standing wave in the frame. It is by controlling and minimizing the amplitude of this standing wave in the frame member that I am able to obtain satisfactory conveying operations over a large range of conveyor lengths, operating capacities, conditions, and materials, with no apparent vibration being transmitted to the building structure.

Two important factors are believed to be responsible for the improved operating results obtained by my conveyor system. These factors mainly concern the frame member, its construction and its manner of use. First, there is the construction of the frame member with its plurality of hollow elongate sections rigidly connected end to end by means of rigid end plates which provide radial flanges at each connection. This form of construction serves to reduce the amplitude of the standing wave without changing the wave length.

Secondly, and not the least, is the weighting of each of the hollow sections of the frame member, as by means of a filling of a dry, particulate material, such as sand. Particulate material, as a weight means, provides a substantially "live" weight wherein each particle is movable, and in so moving, absorbs a portion of the forces acting on the frame in the vertical direction, and dissipates that energy in heat producing friction. This weight, distributed along the length of the frame member, also serves to reduce the amplitude of the standing wave so that the vertical movements of the frame, which absorbs the vertical reactive force components of the conveying member, can be readily absorbed by the helically coiled spring "cushions" of the secondary spring system without transmitting vibrations to the building structure and without materially affecting the load carrying capacity of the conveying member.

In a typical conveyor, 60 feet long and constructed according to my invention, the conveying member is made up of 10-foot sections of aluminum tubing having a 6-inch outside diameter and a 0.080 inch wall thickness. The frame member is also made in 10-foot sections, each of which is formed from 6-inch outside diameter steel tubing having an 11 gauge wall thickness and weighing 7½ pounds per foot, each section having a flat closure plate, of greater diameter than the tube, welded on to each end. Each section of this frame member is 95% filled with concrete sand which weighs 19 pounds per foot of frame tubing.

The conveying member is supported from the frame by 12 beams or spring sets, each set being formed of 4 plates made of epoxy impregnated sheets of fiberglass. These plates are 4½ inches wide, 12 inches long and about ⅛ inch thick and are assembled in a stack, with suitable spacers at each end to provide a spring beam about ¾ inch thick. These beams are mounted to the clamp means so as to leave 7 inches of flexible spaced plate length between the conveying member and the frame. These spring members or beams are uniformly spaced along the conveyor member on 5-foot centers so as to leave about 2½ feet of overhang at each of the conveying member.

The frame member is supported from the floor on coiled compression springs each loosely mounted on a ¾-inch threaded rod which, in turn, is attached to the end of a ¾-inch standard iron pipe mounted on the floor by a conventional floor flange. These supporting legs are located on 10-foot centers, except for those at each side of the drive section. The spacing of the supporting legs, and also of the spring plates or beams, may be varied as much as plus or minus 1½ feet when necessary to avoid installation obstructions.

In this conveyor, the total weight of the conveying member with its spring clamps, plus ⅓ of the weight of the fiberglass springs, is 375 pounds. This is the mass factor $M_1$ used to calculate the critical frequency of the conveying member portion of the conveyor system. The total spring constant $K_1$ of the fiberglass springs, also used to calculate the critical frequency of the conveying member portion of the system, is 9840 pounds per square inch. The total weight, or mass factor $M_2$, of the frame with its sand fill, the spring clamps, the drive section and motor, plus ⅔ of the fiberglass spring weight is 2260 pounds; and the total spring constant $K_2$ of the coiled secondary springs is 4900 pounds per inch. Since there are seven sets of secondary springs used to support this conveyor system, each set consisting of two springs, the spring constant for each spring is 350 pounds per inch. This factor is not critical, however, and may be varied over a considerable range.

The drive section for this conveyor is operated at about 800 r.p.m., or slightly below the critical frequency of the system formed by the $M_1$ mass and the $K_1$ spring constant, and produces a combined thrust (both weights) of 2000 pounds at that speed. This results in the conveying member having a forward stroke of ⅜ inch and a total amplitude of ¾ inch.

In this conveyor system, it was found that locating the drive means between the seventh and eighth spring beam sets or about 25 feet from the outlet end of the conveying member, results in a minimum amplitude for the standing wave, the least vertical vibration of the frame member, and the most conveying capacity for the conveying member.

The total weight or mass of the frame portion of the conveyor system is also a major contributing factor toward determining the character of the standing wave in the elongate beam comprising the frame member itself. For one thing, the greater the mass of this "floating" structure, the lower will be its critical frequency compared with that of the conveying member portion of the system and in this regard I have found the best overall operation is had when the critical frequency of the conveying member portion of the system is about 3 times or more greater than that of the frame portion of the system, as in the case of the 60-foot conveyor above described.

Also, the mass factor ratio of the two portions of the improved floating or cushion supported conveyor system is an important consideration in controlling the amplitude of the standing wave in the elongate frame member. In the above described conveyor the total weight or mass of the frame portion of the system is 6 times that of the conveying member portion. I have found that this mass ratio should be at least 4 to 1 and may be as high as 8 to 1. Nevertheless the total weight of the entire system—that is, the weight in suspension on the supporting structure, such as the floor or ceiling of an industrial building—is very much less than that of prior vibratory conveyor systems of the same length and capacity because very light weight structures may be employed for the conveying member portion. Thus in spite of the relatively high mass ratio, the improved conveyor system can be considered to be a "light weight" conveyor insofar as building floor-load is concerned.

The main advantages of my present invention reside in the fact that vibrations transmitted to the building structure are almost indiscernible and are very much below the level of vibrations transmitted from prior conveyor systems of this type; and in the fact that this improved conveyor will handle high-density materials, as well as light weight materials, at very favorable quantity and flow rates. Other advantages reside in the comparatively light weight of the conveyor system as a whole, due to the fact that heavy and massive foundations are not required; and in the relatively large ratio of the frame and conveying member masses whereby dampening of the frame member vibrations can be had without materially reducing the flow capacity of the conveying member.

Although but one specific embodiment of this invention is herein shown and described, it will be understood that numerous details of the structure shown may be altered or omitted without departing from the spirit of this invention, as defined by the following claims.

I claim:
1. A vibratory conveyor of the class described comprising,
    (a) an elongate substantially rigid frame member having a plurality of individual hollow sections rigidly connected in end to end relation,
    (b) an elongate conveying member formed to provide a channel for the flow of conveyed material therealong,
    (c) a plurality of inclined spring beams spaced along said frame member for supporting said conveying member resiliently therefrom, and in parallel relation therewith,
    (d) dry particulate weight means of predetermined mass distributed uniformly along the length of each section of said frame member,
    (e) drive means on said frame member intermediate its ends for applying directly thereto a cyclical force having major components parallel with the longitudinal axis of the frame member, and
    (f) a plurality of vertically resilient helical compression springs spaced lengthwise of said frame member for supporting the same vertically from a suitable suspension means,
    (g) each of said hollow frame sections being closed at its ends by a solid plate, whereby the particulate weight means operates to dampen the vertical vibration of said frame member produced by said drive means.

2. A vibratory conveyor according to claim 1 wherein the vertically resilient means for supporting the frame member comprises a helically coiled spring loosely threaded on and vertically supported by a rod extending vertically from a suitable support, and said resilient means are disposed in pairs one on each side of the frame member.

3. A vibratory conveyor as defined by claim 1 wherein the weight of the frame member and drive means is at least four and not more than eight times greater than the combined weight of the conveying member and the spring beams supporting the same.

4. A vibratory conveyor according to claim 1 wherein the weight of the parts is such that the critical frequency of the conveying member including ⅓ the weight of the spring beams is at least about three times greater than the critical frequency of the frame member including ⅔ of the weight of the spring beams.

5. A vibratory conveyor according to claim 1 wherein the weight means comprises sand substantially filling each section.

6. A vibratory conveyor according to claim 1 wherein the means for supporting the frame member includes a plurality of pairs of rigid support rods fixed to and extending vertically from the suspension means, one of each pair being disposed on a respective side of said frame member, a helical compression spring is threaded over each of said rods and bottomed on means adjustable axially along the rod, and the frame member is carried by means slideable on said rods and resting upon the upper ends of the respective compression springs.

References Cited

UNITED STATES PATENTS

| | | | |
|---|---|---|---|
| 2,872,024 | 2/1959 | Sernetz | 198—220 |
| 2,951,581 | 9/1960 | Long | 198—220 |
| 3,032,175 | 5/1962 | Thomas | 198—220 |
| 3,063,546 | 11/1962 | Sherwen | 198—220 |
| 3,165,197 | 1/1965 | Allen et al. | 198—220 |
| 3,173,768 | 3/1965 | Witte | 198—220 X |

FOREIGN PATENTS

| | | |
|---|---|---|
| 584,435 | 9/1933 | Germany. |
| 1,005,899 | 4/1957 | Germany. |
| 541,679 | 5/1956 | Italy. |

RICHARD E. AEGERTER, *Primary Examiner.*

EVON C. BLUNK, *Examiner.*

A. C. HODGSON, *Assistant Examiner.*